United States Patent
Oh et al.

(10) Patent No.: US 8,409,020 B2
(45) Date of Patent: Apr. 2, 2013

(54) CROSS GROOVE TYPE CONSTANT VELOCITY JOINT WITH COMPOSITE GROOVE PATTERNS

(75) Inventors: Seung Tark Oh, Farmington Hills, MI (US); Tae Hong Kim, West Bloomfield, MI (US)

(73) Assignee: Hyundai Wia Corporation (KR)

( * ) Notice: Subject to any disclaimer, the term of this patent is extended or adjusted under 35 U.S.C. 154(b) by 0 days.

(21) Appl. No.: 13/477,186

(22) Filed: May 22, 2012

(65) Prior Publication Data
US 2012/0238370 A1 Sep. 20, 2012

Related U.S. Application Data

(62) Division of application No. 12/563,029, filed on Sep. 18, 2009.

(51) Int. Cl.
*F16D 3/226* (2006.01)
(52) U.S. Cl. .................................. 464/144; 464/906
(58) Field of Classification Search .............. 464/140, 464/144, 146, 906
See application file for complete search history.

(56) References Cited

U.S. PATENT DOCUMENTS

| | | | | |
|---|---|---|---|---|
| 2,322,570 | A * | 6/1943 | Dodge | 464/144 |
| 3,083,548 | A * | 4/1963 | Zeidler | 464/144 |
| 7,347,786 | B2 * | 3/2008 | Mondragon-Parra et al. | 464/144 |
| 2009/0017922 | A1 * | 1/2009 | Mondragon-Parra et al. | |

* cited by examiner

*Primary Examiner* — Gregory Binda
*Assistant Examiner* — Matthieu Setliff
(74) *Attorney, Agent, or Firm* — Park & Associates IP Law, P.C.

(57) ABSTRACT

A constant velocity joint for a drive system comprises: an outer joint member having a plurality of inwardly facing outer ball grooves, the outer ball grooves consisting of a first group of grooves and a second group of grooves with composite or non-linear groove pattern; an inner joint member disposed inside the outer joint member and having a plurality of outwardly facing inner ball grooves consisting of a first group of grooves and a second group of grooves with composite or non-linear groove pattern, each inner ball groove of the inner joint member being coupled with a corresponding outer ball groove of the outer joint member generally in crossed pair.

4 Claims, 10 Drawing Sheets

Section A-A (a)          (b)          (c)

Section B-B (a)          (b)          (c)

CROSS GROOVE TYPE CONSTANT VELOCITY JOINT WITH COMPOSITE GROOVE PATTERNS

REFERENCE TO RELATED APPLICATIONS

This is a divisional of pending U.S. patent application Ser. No. 12/563,029 filed on Sep. 18, 2009, the entire contents of which are incorporated herein by reference.

FIELD OF THE INVENTION

The present invention relates to a cross groove type constant velocity joint for use in a drive system, and more particularly, to a cross groove type constant velocity joint having composite groove shapes, typically for use in a drive system of, for example, an automobile for transmitting rotational torque between two rotating shafts thereof.

BACKGROUND OF THE INVENTION

A cross groove type constant velocity joint (hereinafter to be referred as a "cross groove joint") is one type of constant velocity universal joints used for transmitting rotational torque between the rotating shafts (i.e., the driving shaft and the driven shaft), typically for the drive system of automobiles. The cross groove joint includes an outer joint member with a plurality of ball grooves formed on the inner surface thereof, and an inner joint member with a plurality of ball grooves formed on the outer surface thereof, in which the corresponding ball grooves of the outer joint member and the inner joint member are configured to pair with each other and slanted in opposite directions with respect to the center or rotating axis of the joint.

FIGS. 1-2 illustrate one example of a conventional cross groove type joint which retains six balls in the ball grooves for transmitting the rotational torque between the outer and inner joint members to drive the drive system. This cross groove joint includes an outer joint member 1 with six grooves formed on the inner surface thereof, an inner joint member 3 with six grooves formed on the outer surface thereof, six balls 2 retained in the paired grooves of the outer and inner joint members for torque transfer between the outer and inner joint members 1 and 3, and a cage 4 configured to support the balls 2 to a plane bisecting the angle of articulation between the axes of rotation of the outer and inner joint members 1 and 3.

In the structure of the conventional cross groove joint as shown in FIG. 2, the outer joint member 1 has a plurality of (i.e., six) inwardly facing outer ball grooves 1a alternately skewed with a skew angle δ in opposite directions relative to an axis of rotation of the outer joint member 1. The inner joint member 3 positioned inside the outer joint member 1 has a plurality of (i.e., six) outwardly facing inner ball grooves 3a alternately skewed with the same skew angle δ in opposite directions relative to an axis of rotation of the inner joint member 3. The outer and inner ball grooves 1a and 3a face each other in crossed pairs with each of the balls 2 positioned between each crossed pair for torque transfer between the inner and outer joint members 1 and 3. As the ball 2 is retained in the cage 4, the ball 2 is limited in a ball movement range L2 in the circumferential direction of the joint, and the outer joint member 1 has a minimum thickness L1 on one side of the member. To secure the movement of the balls 2, the cage 4 includes a plurality of (i.e., six) cage windows 4a with a dimension sufficient to accommodate the ball movement L2. As a result, the width L4 of each cage web 4b must be designed to have a dimension at least the same or less than the minimum thickness L1 of outer joint member 1.

In an attempt to reduce a transmission error and to make the design of the joint more compact, the cross groove joints retaining eight balls have been suggested. The eight-ball type cross groove joint known in the art typically has a basic structure generally the same or similar to that shown in FIGS. 1-2, however, with the number of the balls and the number of the ball grooves of the outer and inner joint members respectively increased from six to eight. FIGS. 3(a) and (b) illustrate a conventional cross groove joint with eight balls. Like the six ball cross groove joint, the eight ball cross groove joint includes an outer joint member 11, an inner joint member 33, balls 22 for torque transfer between the outer and inner joint members, and a cage 44 configured to support the balls to a plane bisecting the angle of articulation between the axes of rotation of the outer and the inner joint member.

In the structure of the conventional eight ball type cross groove joint as shown in FIG. 4, the outer joint member 11 has a plurality of inwardly facing outer ball grooves 11a alternately skewed with a skew angle δ in opposite directions relative to an axis of rotation of the outer joint member. The inner joint member 33 placed inside the outer joint member 11 similarly has a plurality of (i.e., eight) outwardly facing inner ball grooves 33a alternately skewed with the same skew angle δ, however, oriented in opposite directions relative to an axis of rotation of inner joint member 33. The outer and inner ball grooves 11a and 33a face each other in crossed pairs with each of the balls 22 retained between each crossed pair for torque transfer between the inner and outer joint members. As the ball 22 is retained in the cage 44, the ball 22 is limited in a ball movement range L22 in the circumferential direction of the joint, and the outer joint member 11 has a minimum (least) thickness L11 on one side of the member. To secure the movement of the balls 22, the cage 44 includes a plurality of (i.e., eight) cage windows 44a with a dimension sufficient to accommodate the ball movement L22. As a result, the width L44 of each cage web 44b must be designed to have a dimension the same or less than the minimum thickness L11 of outer joint member 11.

As the cross groove joint with higher balls (e.g., eight or more balls) can provide more compact design and secure a smoother and reliable operation as compared to the cross groove joint with six balls, it would be desirable to produce a higher ball (e.g., eight or more balls) type cross groove joint which has the same or equivalent durability as that having six balls. More specifically, if the cross groove joint with eight balls, for example, is designed to have the same pitch circle diameter (PCD) as the joint having six balls, the ball diameter of the eight ball joint can be reduced because the load on each ball groove and the stress onto the cage web 44b decreases by the increase of the number of the balls. In addition, the size of each cage window 44a can also be reduced compared to the joint containing six balls.

However, the higher ball (e.g., eight ball) type cross groove joint may also include certain shortcomings or disadvantages as described below, for example. Because the eight ball type joint includes more (i.e., eight) cage windows 44a, the thickness of the cage web 44b is also reduced, and thus, the stress on the cage web 44b becomes greater than that of the six ball type. Comparing to the joint with six balls having the same PCD, the increased amount of stress on the cage web (due to the reduction of cage web thickness) exceeds that of the decreased amount of stress owing to the increase of the number of balls. Therefore, the higher ball (e.g., eight ball) type cross groove joint may have a weakened strength and dura-
} bility in the cage web, and thus, the load bearing capacity of the joint can be deteriorated than that of the conventional six ball type joint.

SUMMARY OF THE INVENTION

In order to solve the above described and other shortcomings or drawbacks known in the conventional cross groove joints, the present invention provides a cross groove joint (preferably, but not necessarily, of higher ball type) with a compact and durable structure, in particular, with the strength of the cage web enhanced than that of the conventional cross groove joints as described above.

In order to provide an enhanced strength to the cage web of the cross groove joint, the present invention provides a cross groove joint including an outer joint member with a plurality of inwardly facing ball grooves and an inner joint member with a plurality of outwardly facing ball grooves, in which the shapes of the ball grooves of the outer and inner joint member are configured to increase the thickness and also the mechanical strength of the cage web as compared to the conventional cross groove joint as described above.

The mechanical strength and durability of the cage is influenced by skew angle δ (see FIG. 4, for example). As the skew angle δ of the ball grooves for the outer and inner joint members 11 and 33 increases, the ball movement L22 in circumferential direction increases and the size of cage window 44a should also be increase to accommodate the ball movement in the movement range. As a consequence, the thickness of cage web 44b between two adjacent windows 44a becomes smaller as the skew angle of the grooves for the inner and outer joint member increases. Therefore, considering all the factors described above, the applicant of the present application has discovered several effective ways to reduce the ball movements and the size of cage windows in the cross groove joint (preferably, but not necessarily, of the type having eight or more balls) by decreasing the skew angle and also optimizing the shapes of the ball grooves. In this regard, the present invention has incorporated composite groove patterns (for example, such as a combination of linear and non-linear grooves, or of skewed grooves and non-linear grooves) to the ball grooves of the outer and inner joint members. As a consequence, by applying the inventive design to the cross groove joint, the thickness of the cage web and the mechanical strength of the cage and the joint can be increased over the conventional type joint as shown in FIG. 4, for example.

According to the present invention, in particular, as described with the eight ball type joint, for example, in order for the eight ball cross groove joint to secure the strength and durability of the cage to the level similar or equivalent to that of the six ball cross groove joint having the same pitch circle diameter (PCD), the skew angle is minimized and the minimum thickness (least effective thickness) of the outer and inner joint members (and thus, the thickness of the cage web as well) are maximized as compared to the conventional joint described above without any degradation of functions in the joint.

According to one aspect of the present invention, a cross groove type constant velocity joint for a drive system comprises: an outer joint member having a plurality of inwardly facing outer ball grooves, the outer ball grooves consisting of a first group of grooves and a second group of grooves with composite or non-linear groove pattern; an inner joint member disposed inside the outer joint member and having a plurality of outwardly facing inner ball grooves consisting of a first group of grooves and a second group of grooves with composite or non-linear groove pattern, each inner ball groove of the inner joint member being coupled with a corresponding outer ball groove of the outer joint member generally in crossed pair; and a cage having circumferentially displaced cage windows to accommodate a plurality of balls therein. The groove patterns of the ball grooves can be a combination of skewed grooves and non-linear grooves, a combination of non-linear grooves such as a curved groove or a compositely shaped groove, or a combination of linear grooves and non-linear grooves.

According to one preferred embodiment of the invention, a cross groove type constant velocity joint for a drive system comprises: an outer joint member having a plurality of inwardly facing outer ball grooves, the outer ball grooves consisting of a first group of grooves, each groove of which having a skewed groove shape with a skew angle other than zero and alternately arranged in opposite directions relative to an axis of rotation of outer joint member, and a second group of grooves, each groove of which having a non-linear groove shape formed with two or more groove segments having different skew angles relative to an axis of rotation of outer joint member; an inner joint member disposed inside the outer joint member and having a plurality of outwardly facing inner ball grooves consisting of a first group of grooves, each groove of which having a skewed groove shape with a skew angle other than zero and alternately arranged in opposite directions relative to an axis of rotation of inner joint member, and a second group of grooves, each groove of which having a non-linear groove shape formed with two or more groove segments having different skew angles relative to an axis of rotation of inner joint member, each inner ball groove of the inner joint member being coupled with a corresponding outer ball groove of the outer joint member generally in crossed pair; a plurality of torque transfer balls which are guided by the ball groove faces of outer and inner joint member; and a cage having circumferentially displaced windows to accommodate the balls therein.

According to another preferred embodiment of the invention, a cross groove type constant velocity joint for a drive system comprises: an outer joint member having a plurality of inwardly facing outer ball grooves, the outer ball grooves consisting of a first group of grooves, each groove of which having a skewed groove shape with a skew angle other than zero and alternately arranged in opposite directions relative to an axis of rotation of outer joint member, and a second group of grooves, each groove of which having a continuously curved groove shape; an inner joint member disposed inside the outer joint member and having a plurality of outwardly facing inner ball grooves consisting of a first group of grooves, each groove of which having a skewed groove shape with a skew angle other than zero and alternately arranged in opposite directions relative to an axis of rotation of inner joint member, and a second group of grooves, each groove of which having a continuously curved groove shape, each inner ball groove of the inner joint member being coupled with a corresponding outer ball groove of the outer joint member generally in crossed pair; a plurality of torque transfer balls which are guided by the ball groove faces of outer and inner joint member; and a cage having circumferentially displaced windows to accommodate the balls therein.

According to another preferred embodiment of the invention, a cross groove type constant velocity joint for a drive system comprises: an outer joint member having a plurality of inwardly facing outer ball grooves, the outer ball grooves consisting of a first group of grooves, each groove of which having a continuously curved groove shape, and a second group of grooves, each groove of which having a continuously curved groove shape arranged in direction opposite to the groove of the first group of grooves; an inner joint member disposed inside the outer joint member and having a plurality of outwardly facing inner ball grooves consisting of a first group of grooves, each groove of which having a continuously curved groove shape, and a second group of grooves, each groove of which having a continuously curved groove shape arranged in direction opposite to the groove of the first group of grooves, each inner ball groove of the inner joint member being coupled with a corresponding outer ball groove of the outer joint member generally in crossed pair; a plurality of torque transfer balls which are guided by the ball groove faces of outer and inner joint member; and a cage having circumferentially displaced windows to accommodate the balls therein.

According to another preferred embodiment of the invention, a cross groove type constant velocity joint for a drive system comprises: an outer joint member having a plurality of inwardly facing outer ball grooves, the outer ball grooves consisting of a first group of grooves, each groove of which having a non-linear groove shape formed with two or more groove segments having different skew angles relative to an axis of rotation of outer joint member, and a second group of grooves, each groove of which having a non-linear groove shape formed with two or more groove segments having different skew angles relative to an axis of rotation of outer joint member; an inner joint member disposed inside the outer joint member and having a plurality of outwardly facing inner ball grooves consisting of a first group of grooves, each groove of which having a non-linear groove shape formed with two or more groove segments having different skew angles relative to an axis of rotation of outer joint member, and a second group of grooves, each groove of which having a non-linear groove shape formed with two or more groove segments having different skew angles relative to an axis of rotation of inner joint member, each inner ball groove of the inner joint member being coupled with a corresponding outer ball groove of the outer joint member generally in crossed pair; a plurality of torque transfer balls which are guided by the ball groove faces of outer and inner joint member; and a cage having circumferentially displaced windows to accommodate the balls therein.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Figure 1A:
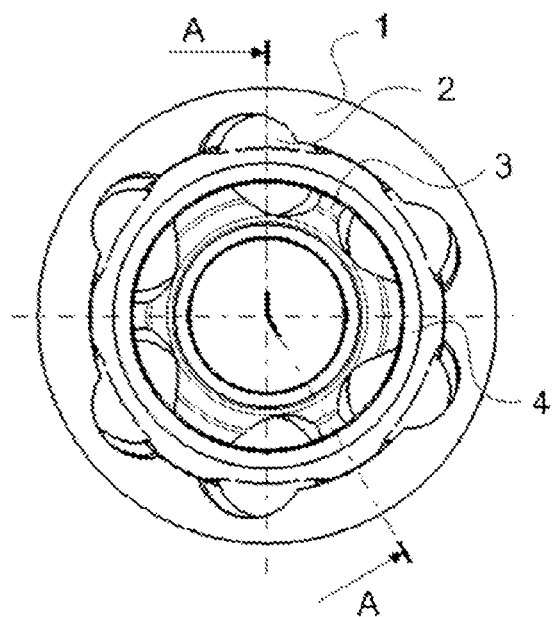
FIG. 1(a) is a view illustrating a conventional cross groove joint with six balls.
Figure 1B:
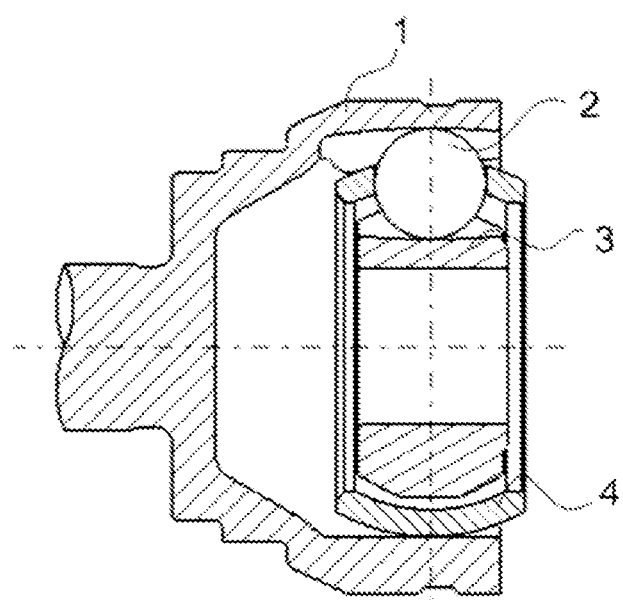
FIG. 1(b) is a cross-sectional view of the conventional cross groove joint as shown in FIG. 1(a), taken along line A-A in the figure.
Figure 2:
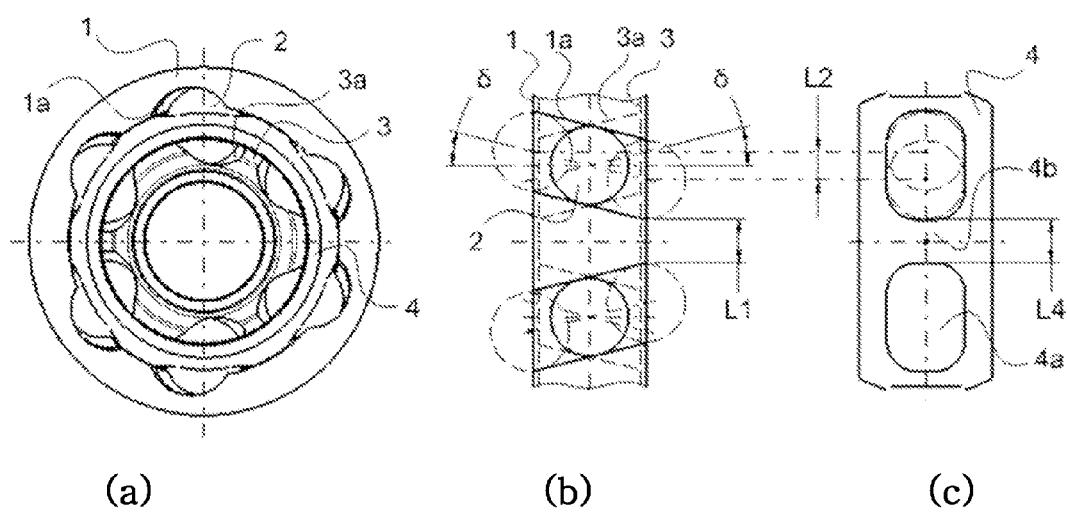
FIGS. 2(a)-2(c) are, respectively, a view of a conventional cross groove joint with six balls, a partial side view thereof for illustrating the shapes of the ball grooves in the outer and inner joint members and movements of the balls in the grooves, and a partial side view for illustrating movements of the balls in the cage.
Figure 3A:
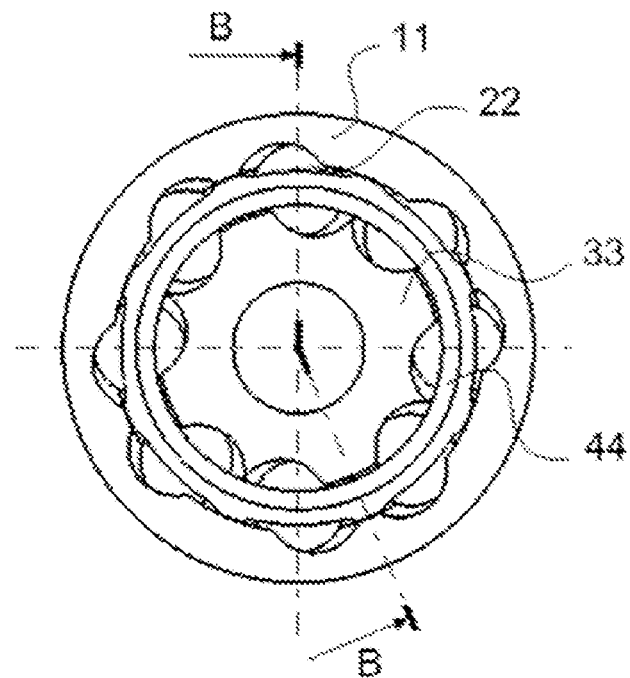
FIG. 3(a) is a view illustrating a conventional cross groove joint with eight balls.
Figure 3B:
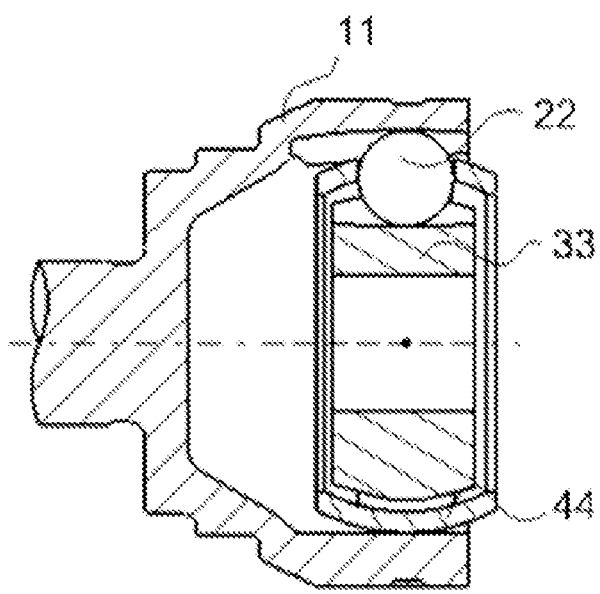
FIG. 3(b) is a cross-sectional view of the conventional cross groove joint as shown in FIG. 3(a), taken along line B-B in the figure.

The present invention will be explained and illustrated below in association with several embodiments to be described later, in particular, the cross groove joint of eight ball type. However, it is noted that the present invention is not limited to the eight ball type joint, but is applicable to the cross groove joint of any ball type, for example, having six, eight, ten, or more balls.

Referring to FIGS. 5-10 of the drawings, the cross groove type constant velocity joints of the present invention are described herein in details with several exemplary or preferred embodiments thereof. However, the following descriptions of such embodiments are intended primarily for illustrating the principles and exemplary constructions of the constant velocity joints of the present invention, and the present invention is not specifically limited to these exemplary embodiments. Thus, one skilled in the art can appreciate or recognize that various modifications and substitutions can be made thereto without departing from the spirit and scope of the present invention.

Throughout the description of the present application, common or similar elements are to be referred with the same or similar reference characters for simplicity purposes.

Figure 4:
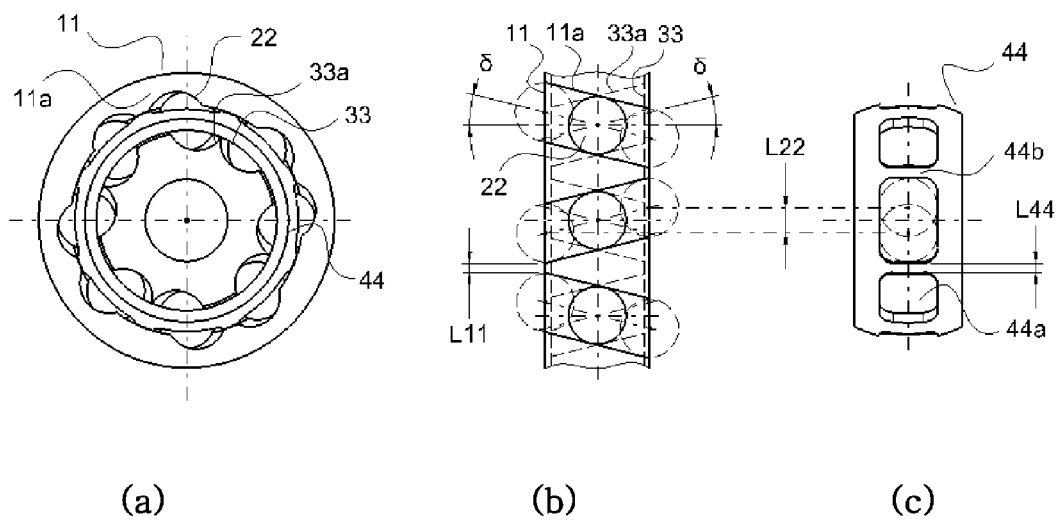
FIGS. 4(a)-4(c) are, respectively, a view of a conventional cross groove joint with eight balls, a partial side development (i.e., deployed or radially projected) view thereof for illustrating the shapes of the ball grooves in the outer and inner joint members and movements of the balls in the grooves, and a partial side view for illustrating movements of the balls in the cage.
Figure 5:
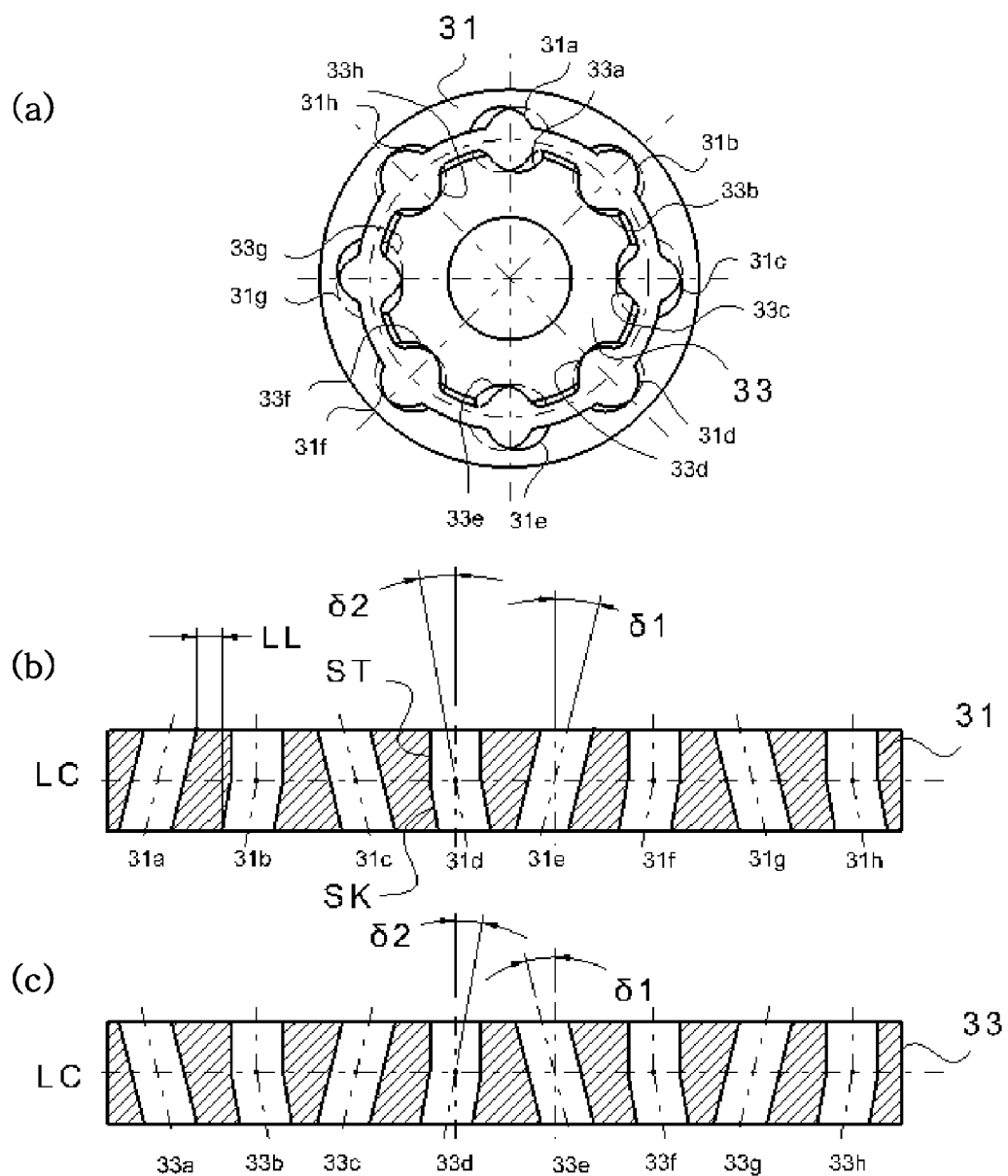
FIGS. 5(a)-5(c) are, respectively, a view of the cross groove type constant velocity joint with eight balls, constructed according to one preferred embodiment of the present invention, a side cross-sectional, development view (i.e., deployed or radially projected on a plane) of the outer joint member thereof, and a side cross-sectional development view of the inner joint member thereof.

With reference to FIG. 5, one preferred embodiment of the present invention is described below in details. In this embodiment, the cross groove joint includes an outer joint member 31 having a plurality of (i.e., eight) inwardly facing outer ball grooves 31a-31h, and an inner joint member 33 placed inside the outer joint member 31 and having a plurality of (i.e., eight) outwardly facing inner ball grooves 33a-33h. The corresponding outer and inner ball grooves 31a-31h and 33a-33h face each other in pairs with each of the eight balls (not shown in FIG. 5) retained between each pair for torque transfer between the inner and outer joint members 31 and 33. The cross groove joint further includes a cage (not shown in FIG. 5) containing eight cage windows (not shown in FIG. 5) for retaining the balls therein and to transmit the rotational torque between the outer and inner joint members as is similar to that shown in FIG. 4. However, unlike the conventional cross groove joint as shown in FIG. 4, having the grooves alternately disposed in opposite directions with the same inclination angle δ, the ball grooves 31a-31h and 33a-33h of the outer and inner joint members have composite or complex shapes as shown in FIGS. 5(b) and 5(c).

More specifically, in the present embodiment the shapes of the ball grooves are differentiated in two groups as illustrated in FIG. 5. In particular, a first group of grooves, namely, four ball grooves 31a, 31c, 31e, 31g of the outer joint member 31 (displaced to each other with the phase angle of 90 degree) and four ball grooves 33a, 33c, 33e, 33g of the inner joint member 33 (displaced to each other with the phase angle of 90 degree) each have a skewed groove with a skew angle δ1 throughout the length of the groove, but alternately arranged in opposite directions. On the other hand, a second group of grooves, namely, the remaining four ball grooves 31b, 31d, 31f, 31h of the outer joint member 31 and the remaining four ball grooves 33b, 33d, 33f, 33h of the inner joint member 33 each have a composite groove shape which consists of a straight groove segment ST from the groove center LC to one end of groove and a skewed groove segment SK from the groove center LC to the other end of groove, each with a skew angle δ2 but arranged alternately in opposite directions. Here, the skew angle δ2 may be selected to have an angle the same as or less than δ1 which is in turn selectable depending on the desired design of the joint system, and generally, in the range between 5 degree and 20 degree. With such a composite groove configuration, combined with a skewed groove and a groove having the straight groove segments ST and the skewed groove segments SK with appropriate skew angle δ, the minimum thickness (the least effective thickness) LL of the outer and inner joint members 31 and 33 can be increased than that of the conventional cross groove joint as shown in FIG. 4. As a result, the ball movements in the cross groove joint and the size of cage windows can be reduced, while enlarging the thickness of cage webs as compared to that shown in FIG. 4. Accordingly, the cross groove joint of the present embodiment can enhance the mechanical strength and durability of the joint as compared to the conventional joint.

Figure 6:
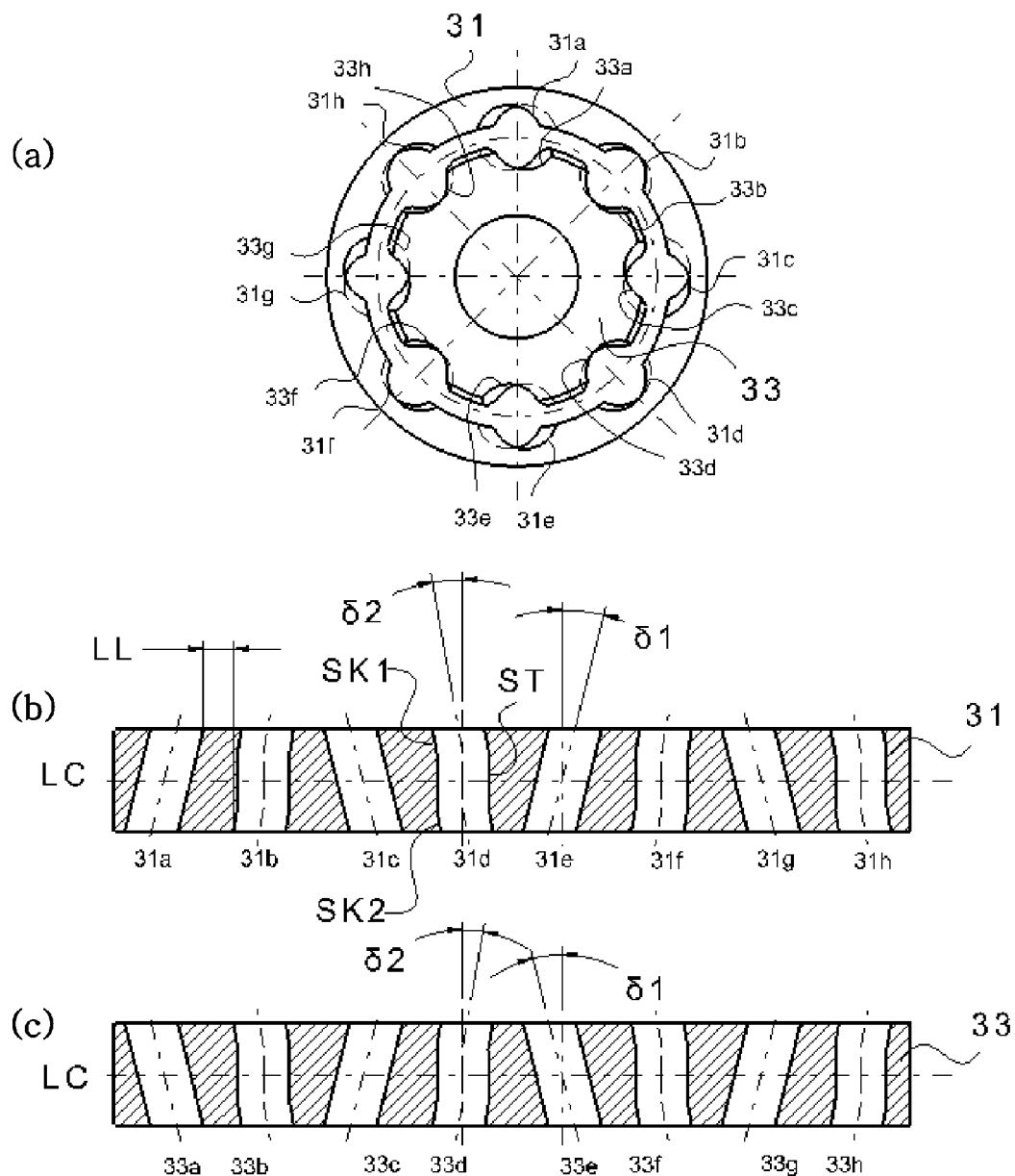
FIGS. 6(a)-6(c) are, respectively, a view of the cross groove type constant velocity joint with eight balls, constructed according to another preferred embodiment of the present invention, a side cross-sectional and development view of the outer joint member thereof, and a side cross-sectional and development view of the inner joint member thereof.

With reference to FIG. 6, another preferred embodiment of the present invention is described below in details. The basic structure of this joint is similar to that described shown in association with FIG. 5 above, and detailed descriptions regarding to the common elements and structure of this embodiment are to be omitted herein for simplicity purposes, and to be referred above.

As is similar to the previous embodiment of FIG. 5, and unlike the conventional cross groove joint as shown in FIG. 4 (which has the grooves alternately disposed in opposite directions with the same inclination angle δ), the ball grooves 31a-31h and 33a-33h of the outer and inner joint members of the present embodiment have composite or complex shapes, in different pattern, as shown in FIGS. 6(b) and 6(c).

More specifically, in this embodiment as illustrated in FIG. 6, a first group of grooves, namely, four ball grooves 31a, 31c, 31e, 31g of the outer joint member 31 (displaced to each other with the phase angle of 90 degree) and four ball grooves 33a, 33c, 33e, 33g of the inner joint member 33 (displaced to each other with the phase angle of 90 degree) each have a skewed groove with a skew angle δ1 throughout the length of the groove, but alternately arranged in opposite directions. On the other hand, a second group of grooves, namely, the remaining four ball grooves 31b, 31d, 31f, 31h of the outer joint member 31 and the remaining four ball grooves 33b, 33d, 33f, 33h of the inner joint member 33 each have a composite groove shape which consists of a straight groove segment ST at the central area relative to the groove center LC and skewed groove segments SK1 and SK2 at the both end regions of the groove, each with a skew angle δ2 but arranged alternately in opposite directions as shown. Here, the skew angle δ2 may be selected to have an angle the same as or less than δ1 which is in turn selectable depending on the desired design of the joint system, and generally, in the range between 5 degree and 20 degree. With such a composite groove configuration as shown, combined with a first group of grooves of alternately-arranged skewed groove and a second group of grooves composed of the straight groove segments ST and the skewed groove segments SK at either or both ends of the groove, the minimum thickness (least effective thickness) LL of the outer and inner joint members 31 and 33 can be increased to that of the conventional cross groove joint as shown in FIG. 4. As a result, the ball movements in the cross groove joint and the size of cage windows can be reduced, while enlarging the thickness of cage webs as compared to that shown in FIG. 4. Accordingly, the cross groove joint of the present embodiment can enhance the mechanical strength and durability of the joint as compared to the conventional joint.

Figure 7:
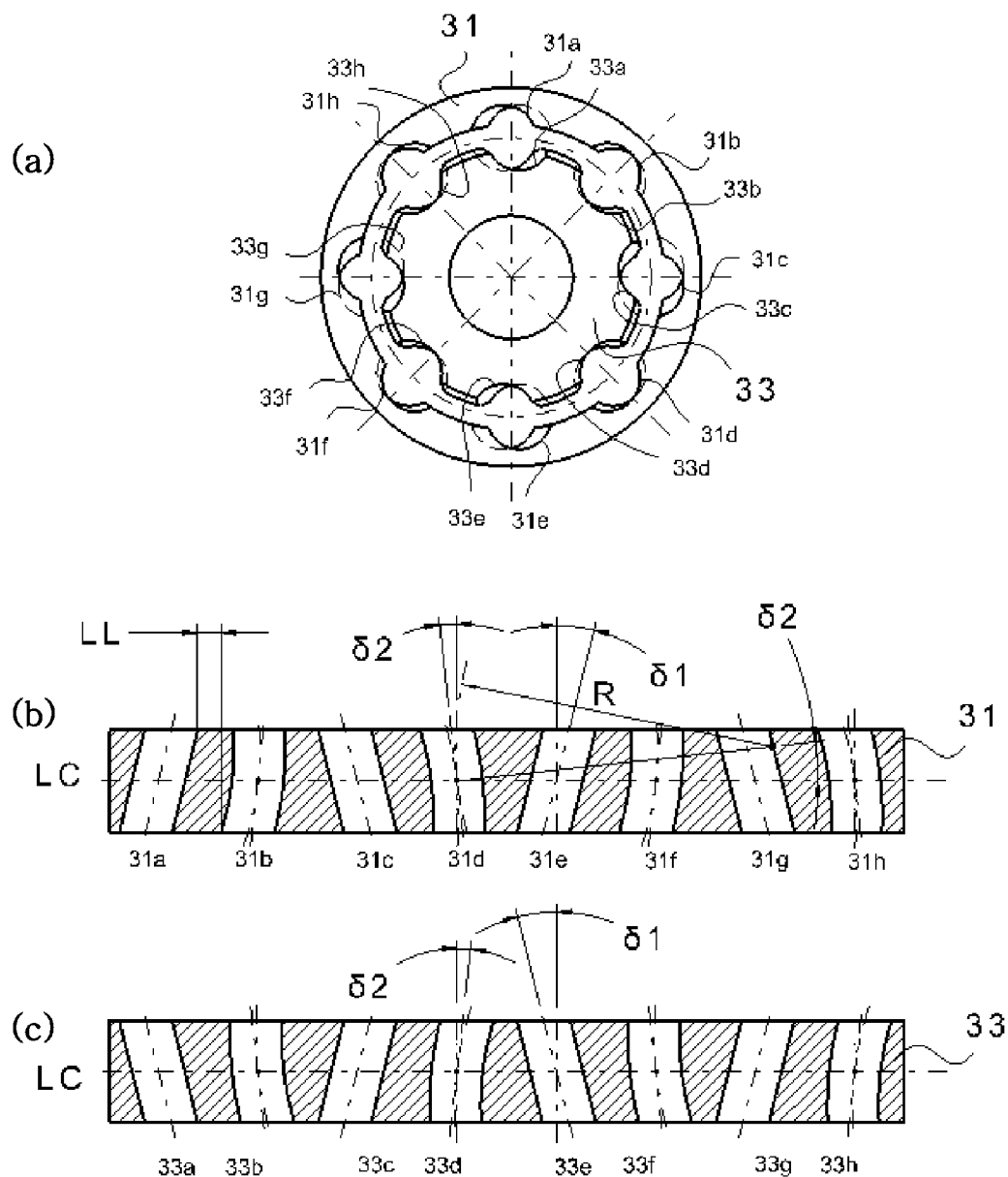
FIGS. 7(a)-7(c) are, respectively, a view of the cross groove type constant velocity joint with eight balls, constructed according to another preferred embodiment of the present invention, a side cross-sectional and development view of the outer joint member thereof, and a side cross-sectional and development view of the inner joint member thereof.

With reference to FIG. 7, another preferred embodiment of the present invention is described below in details. The basic structure of this joint is similar to that described shown in association with FIG. 5 above, and detailed descriptions regarding to the common elements and structure of this embodiment are to be omitted herein for simplicity purposes, and to be referred above.

As is similar to the previous embodiments of FIGS. 5-6, and unlike the conventional cross groove joint as shown in FIG. 4 (which has the grooves alternately disposed in opposite directions with the same inclination angle δ), the ball grooves 31a-31h and 33a-33h of the outer and inner joint members of the present embodiment have composite or complex shapes, in different pattern, as shown in FIGS. 7(b) and 7(c).

More specifically, in this embodiment as illustrated in FIG. 7, a first group of grooves, namely, four ball grooves 31a, 31c, 31e, 31g of the outer joint member 31 (displaced to each other with the phase angle of 90 degree) and four ball grooves 33a, 33c, 33e, 33g of the inner joint member 33 (displaced to each other with the phase angle of 90 degree) each have a skewed groove with a skew angle δ1 throughout the length of the groove, but alternately arranged in opposite directions. On the other hand, a second group of grooves, namely, the remaining four ball grooves 31*b*, 31*d*, 31*f*, 31 *h* of the outer joint member 31 and the remaining four ball grooves 33*b*, 33*d*, 33*f*, 33*h* of the inner joint member 33 each have a curved groove with a skew angle δ2 with a radius R centered on the normal line relatively to the skew angle line at the center, but arranged alternately in opposite directions as shown. Here, the skew angle δ2 may be selected to have an angle the same as or less than δ1 which is in turn selectable depending on the desired design of the joint system, and generally, in the range between 5 degree and 20 degree. With such a composite groove configuration as shown, combined with a first group of grooves of alternately-arranged skewed grooves and a second group of grooves of alternately-arranged curved grooves, the minimum thickness (least effective thickness) LL of the outer and inner joint members 31 and 33 can be increased to that of the conventional cross groove joint as shown in FIG. 4. As a result, the ball movements in the cross groove joint and the size of cage windows can be reduced, while enlarging the thickness of cage webs as compared to that shown in FIG. 4. Accordingly, the cross groove joint of the present embodiment can enhance the mechanical strength and durability of the joint as compared to the conventional joint.

Figure 8:
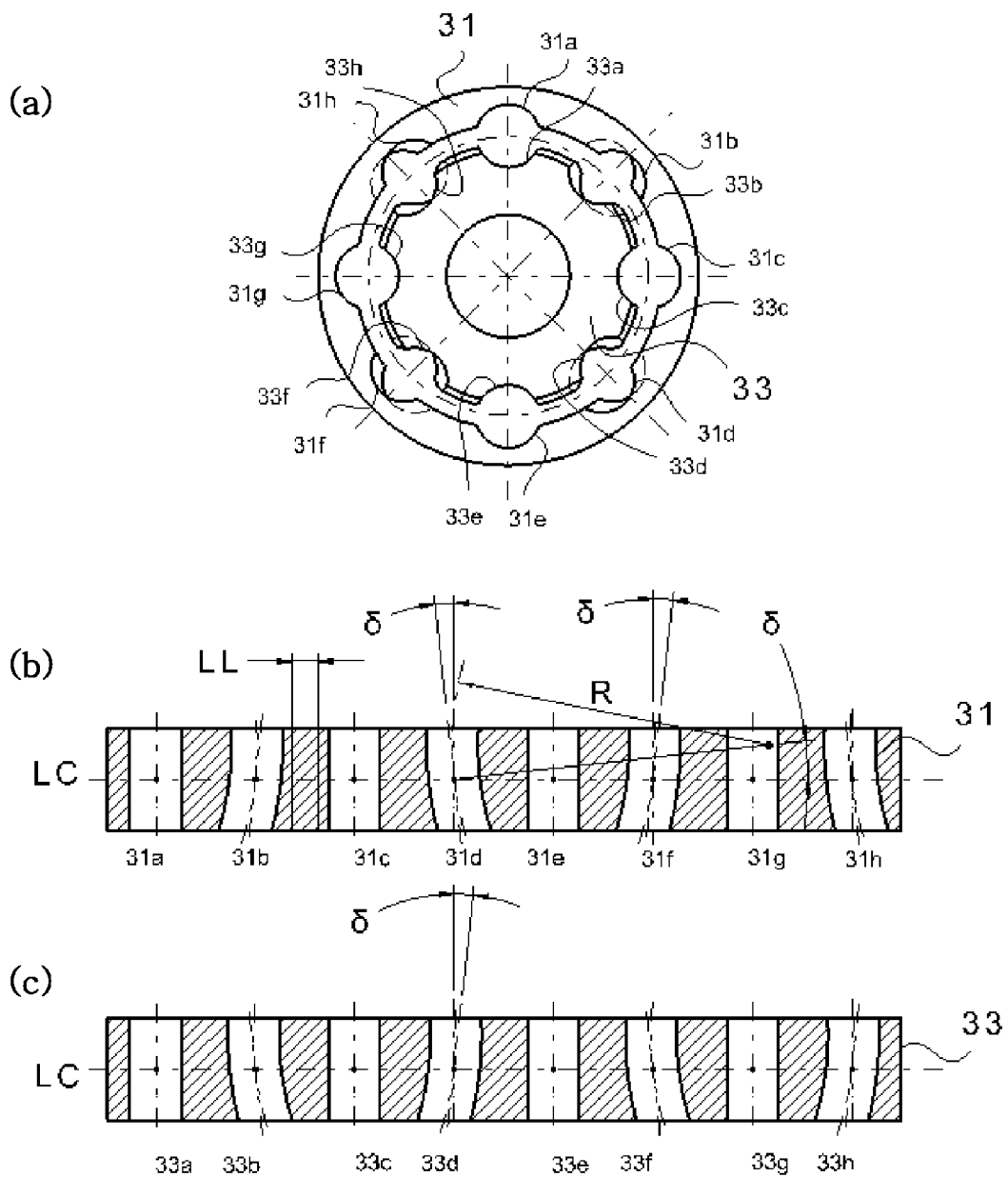
FIGS. 8(a)-8(c) are, respectively, a view of the cross groove type constant velocity joint with eight balls, constructed according to another preferred embodiment of the present invention, a side cross-sectional and development view of the outer joint member thereof, and a side cross-sectional and development view of the inner joint member thereof.

With reference to FIG. 8, another preferred embodiment of the present invention is described below in details. The basic structure of this joint is similar to that described shown in association with FIG. 5 above, and detailed descriptions regarding to the common elements and structure of this embodiment are to be omitted herein for simplicity purposes, and to be referred above.

As is similar to the previous embodiments of FIGS. 5-7, and unlike the conventional cross groove joint as shown in FIG. 4 (which has the grooves alternately disposed in opposite directions with the same inclination angle δ), the ball grooves 31*a*-31*h* and 33*a*-33*h* of the outer and inner joint members of the present embodiment have composite or complex shapes, in different pattern, as shown in FIGS. 8(*b*) and 8(*c*).

More specifically, in this embodiment as illustrated in FIG. 8, a first group of grooves, namely, four ball grooves 31*a*, 31*c*, 31*e*, 31*g* of the outer joint member 31 (displaced to each other with the phase angle of 90 degree) and four ball grooves 33*a*, 33*c*, 33*e*, 33*g* of the inner joint member 33 (displaced to each other with the phase angle of 90 degree) each have a linear or straight groove with no skew angle. On the other hand, a second group of grooves, namely, the remaining four ball grooves 31*b*, 31*d*, 31*f*, 31 *h* of the outer joint member 31 and the remaining four ball grooves 33*b*, 33*d*, 33*f*, 33*h* of the inner joint member 33 each have a curved groove with a skew angle δ with a radius R centered on the normal line relatively to the skew angle line at the center, which are arranged alternately in opposite directions as shown. Here, the skew angle δ may be selected depending on the desired design of the joint system, and generally, in the range between 5 degree and 20 degree. With such a composite groove configuration as shown, combined with a first group of grooves of linear grooves and a second group of grooves of alternately-arranged curved grooves, the minimum thickness (least effective thickness) LL of the outer and inner joint members 31 and 33 can be increased to that of the conventional cross groove joint as shown in FIG. 4. As a result, the ball movements in the cross groove joint and the size of cage windows can be reduced, while enlarging the thickness of cage webs as compared to that shown in FIG. 4. Accordingly, the cross groove joint of the present embodiment can enhance the mechanical strength and durability of the joint as compared to the conventional joint.

Figure 9:
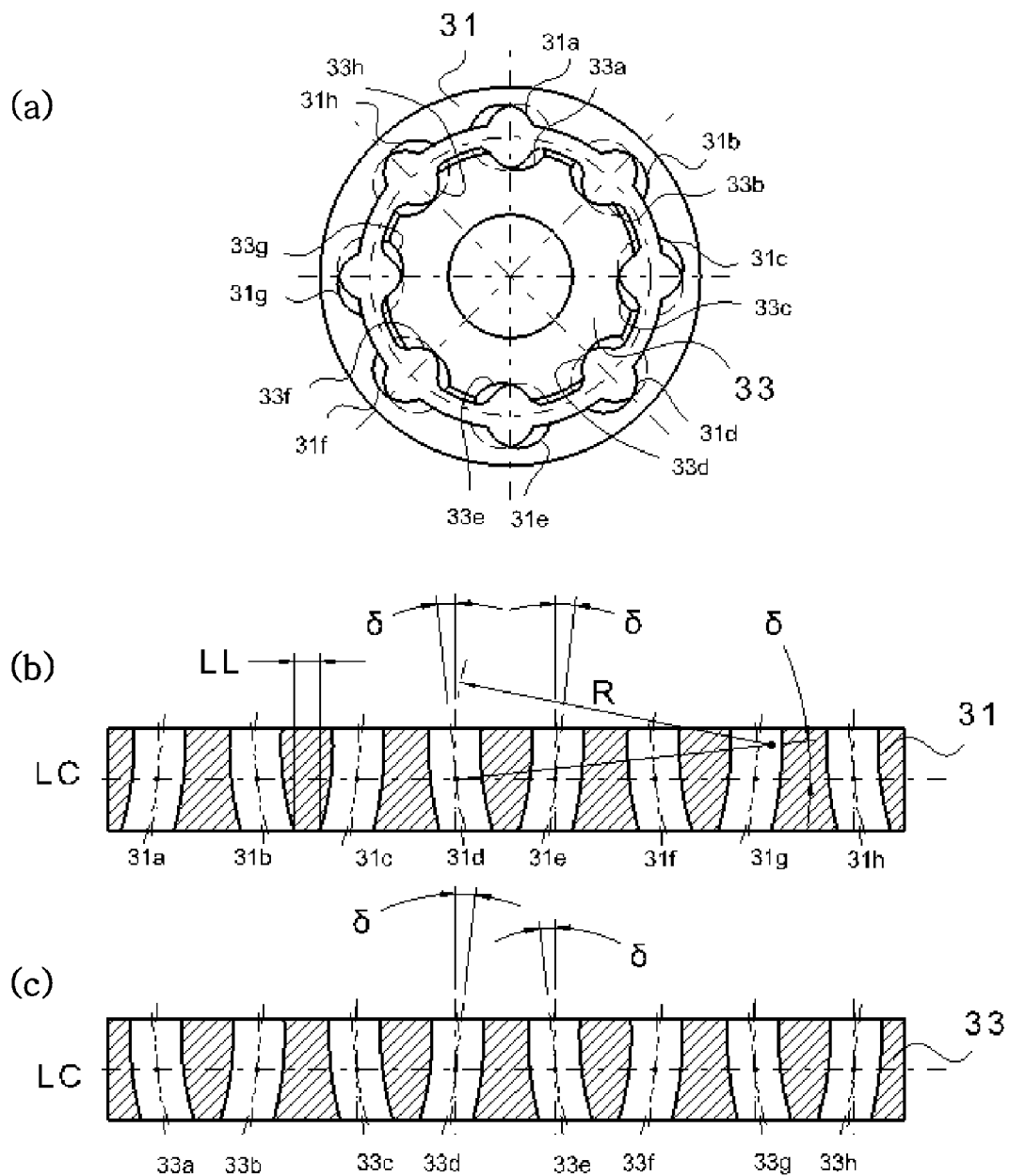
FIGS. 9(a)-9(c) are, respectively, a view of the cross groove type constant velocity joint with eight balls, constructed according to another preferred embodiment of the present invention, a side cross-sectional and development view of the outer joint member thereof, and a side cross-sectional and development view of the inner joint member thereof.

With reference to FIG. 9, another preferred embodiment of the present invention is described below in details. The basic structure of this joint is similar to that described shown in association with FIG. 5 above, and detailed descriptions regarding to the common elements and structure of this embodiment are to be omitted herein for simplicity purposes, and to be referred above.

As is similar to the previous embodiments of FIGS. 5-8, and unlike the conventional cross groove joint as shown in FIG. 4 (which has the grooves alternately disposed in opposite directions with the same inclination angle δ), the ball grooves 31*a*-31*h* and 33*a*-33*h* of the outer and inner joint members of the present embodiment have composite or complex shapes, in different pattern, as shown in FIGS. 9(*b*) and 9(*c*).

More specifically, in this embodiment as illustrated in FIG. 9, four ball grooves 31*a*, 31*c*, 31*e*, 31*g* of the outer joint member 31 (displaced to each other with the phase angle of 90 degree) and four ball grooves 33*a*, 33*c*, 33*e*, 33*g* of the inner joint member 33 (displaced to each other with the phase angle of 90 degree) each have a curved groove with a skew angle δ with a radius R centered on the normal line relatively to the skew angle line at the center. On the other hand, the remaining four ball grooves 31*b*, 31*d*, 31*f*, 31*h* of the outer joint member 31 and the remaining four ball grooves 33*b*, 33*d*, 33*f*, 33*h* of the inner joint member 33 each have a similarly curved groove with the skew angle δ with a radius R centered on the normal line relatively to the skew angle line at the center, but arranged in direction opposite to the first group of grooves described above. Here, the degree of the skew angle δ is selectable depending on the desired design of the joint system, generally, in the range between 5 degree and 20 degree. With such a composite groove configuration, having the oppositely oriented curved grooves in alternate arrangement and with appropriate skew angle δ, the minimum thickness (least effective thickness) LL of the outer and inner joint members 31 and 33 can be increased to that of the conventional cross groove joint as shown in FIG. 4. As a result, the ball movements in the cross groove joint and the size of cage windows can be reduced, while enlarging the thickness of cage webs as compared to that shown in FIG. 4. Accordingly, the cross groove joint of the present embodiment can enhance the mechanical strength and durability of the joint as compared to the conventional joint.

Figure 10:
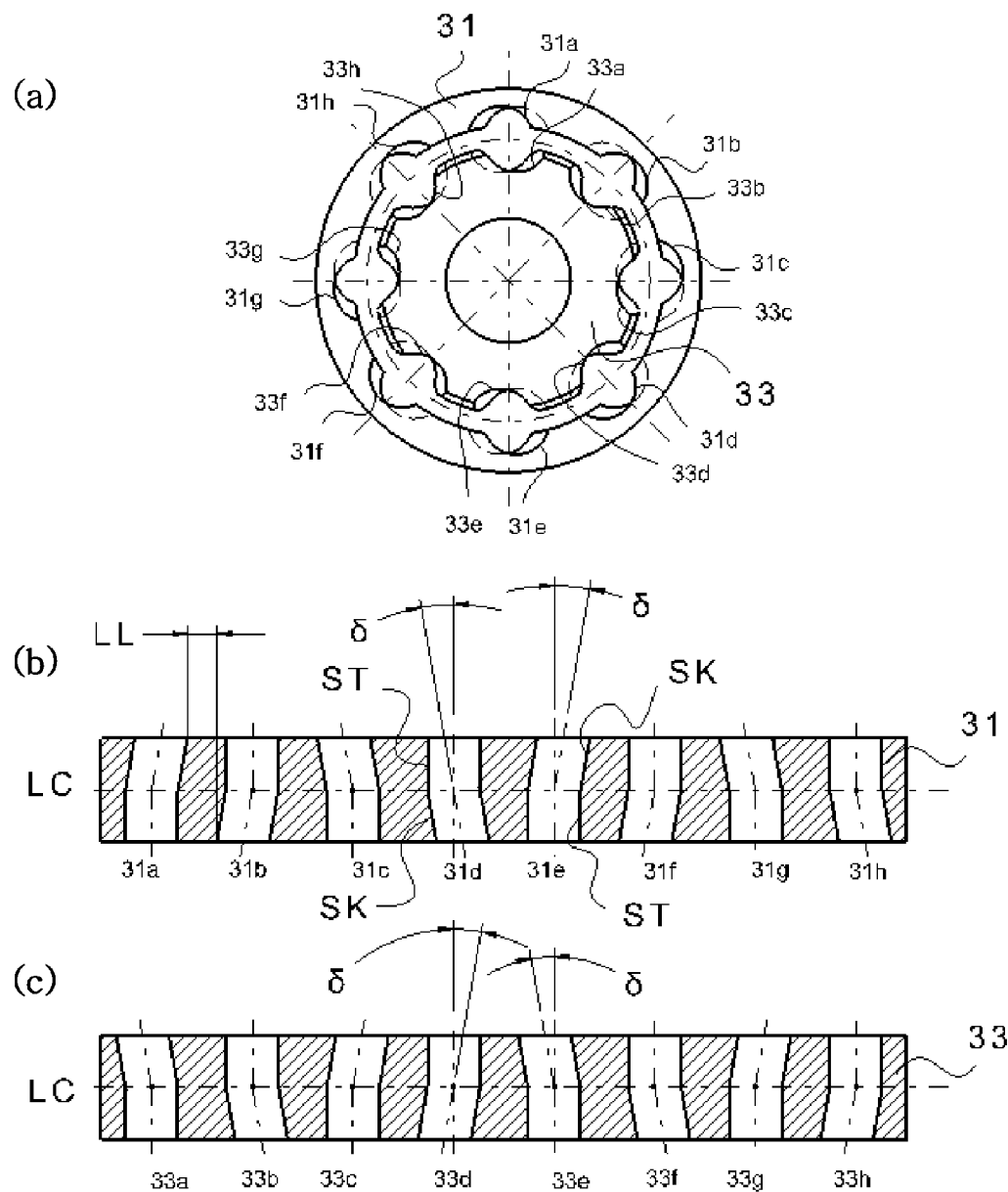
FIGS. 10(a)-10(c) are, respectively, a view of the cross groove type constant velocity joint with eight balls, constructed according to another preferred embodiment of the present invention, a side cross-sectional and development view of the outer joint member thereof, and a side cross-sectional and development view of the inner joint member thereof.

With reference to FIG. 10, another preferred embodiment of the present invention is described below in details. The basic structure of this joint is similar to that described and shown in association with FIG. 5 above, and detailed descriptions regarding to the common elements and structure of this embodiment are to be omitted herein for simplicity purposes, and to be referred above.

As is similar to the previous embodiment of FIGS. 5-9 and unlike the conventional cross groove joint as shown in FIG. 4 (which has the grooves alternately disposed in opposite directions with the same inclination angle δ), the ball grooves 31*a*-31*h* and 33*a*-33*h* of the outer and inner joint members of the present embodiment have composite or complex shapes, in different pattern, as shown in FIGS. 10(*b*) and 10(*c*).

More specifically, in this embodiment, a first group of grooves, namely, four ball grooves 31*a*, 31*c*, 31*e*, 31*g* of the outer joint member 31 (displaced to each other with the phase angle of 90 degree) and four ball grooves 33*a*, 33*c*, 33*e*, 33*g* of the inner joint member 33 (displaced to each other with the phase angle of 90 degree) each have a composite groove shape which consists of a straight groove segment ST from the groove center LC to one end of groove and a skewed groove segment SK from the groove center LC to the other end of groove, each with a skew or inclination angle δ but arranged alternately in opposite directions. On the other hand, a second group of grooves, namely, the remaining four ball grooves 31b, 31d, 31f, 31h of the outer joint member 31 and the remaining four ball grooves 33b, 33d, 33f, 33h of the inner joint member 33 each have a composite groove shape having a straight portion ST and a skewed portion SK with the same skew angle δ, but arranged in opposite directions with respect to the groove center LC relatively to the above-identified first group of grooves. Here, the degree of the skew angle δ is to be selected depending on the desired design of the joint system, generally, in the range between 5 degree and 20 degree. With such a composite groove configuration having the straight groove segments ST and the skewed groove segments SK with appropriate skew angle δ, the minimum thickness (the least effective thickness) LL of the outer and inner joint members 31 and 33 can be increased to that of the conventional cross groove joint as shown in FIG. 4. As a result, the ball movements in the cross groove joint and the size of cage windows can be reduced, while enlarging the thickness of cage webs as compared to that shown in FIG. 4. Accordingly, the cross groove joint of the present embodiment can enhance the mechanical strength and durability of the joint as compared to the conventional joint.

As described above in connection with several exemplary embodiments thereof, in order to provide an enhanced strength to the cage web and the cross groove joint, the present invention provides a cross groove joint including an outer joint member with a plurality of inwardly facing ball grooves and an inner joint member with a plurality of outwardly facing ball grooves, in which the shapes of the ball grooves of the outer and inner joint member are configured to increase the thickness and also the mechanical strength of the cage web as compared to the conventional cross groove joint, in particular, by applying composite and/or non-linear groove patterns to the ball grooves in various different patterns as illustrated with several embodiments as examples.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system comprising:
an outer joint member having a plurality of inwardly facing outer ball grooves, the outer ball grooves consisting of a first group of grooves, each groove of which having a skewed groove shape with a skew angle ($δ1$) other than zero and alternately arranged in opposite directions relative to an axis of rotation of outer joint member, and a second group of grooves, each groove of which having a continuously curved groove shape;
an inner joint member disposed inside the outer joint member and having a plurality of outwardly facing inner ball grooves consisting of a first group of grooves, each groove of which having a skewed groove shape with the skew angle ($δ1$) other than zero and alternately arranged in opposite directions relative to an axis of rotation of inner joint member, and a second group of grooves, each groove of which having a continuously curved groove shape, each inner ball groove of the inner joint member being coupled with a corresponding outer ball groove of the outer joint member generally in crossed pair;
a plurality of torque transfer balls which are guided by the ball groove faces of outer and inner joint member; and
a cage having circumferentially displaced windows to accommodate the balls therein,
wherein the continuously curved groove shape of the second group of grooves of the outer and inner joint members has a skew angle ($δ2$) other than zero at the center of the groove, said skew angle ($δ2$) being the same as or less than said skew angle ($δ1$) of the first group of grooves of the outer and inner joint members.

2. The constant velocity joint of claim 1, wherein the continuously curved groove shape of the second group of grooves of the outer and inner joint members is a circular shape.

3. The constant velocity joint of claim 1, wherein the first group of grooves of the outer and inner joint members, respectively, consist of four ball grooves displaced to one another with a phase angle of 90 degree, and the second group of grooves of the outer and inner joint members, respectively, consist of four ball grooves displaced to one another with a phase angle of 90 degree.

4. The constant velocity joint of claim 1, wherein the number of the torque transfer balls is an even number.

* * * * *